June 24, 1969  E. J. ANANDAM  3,451,894
GAS CAP FOR CULTURE TUBES
Filed April 28, 1967
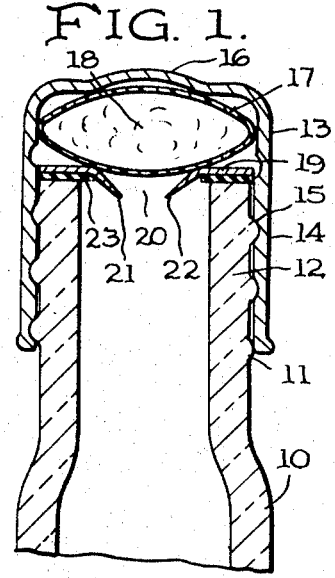
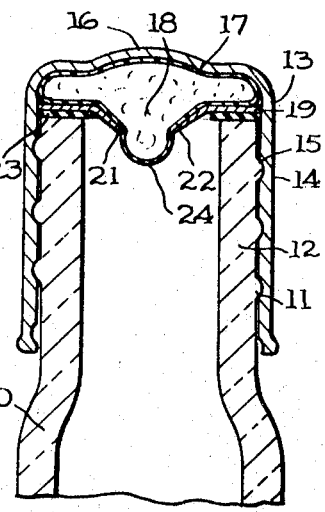
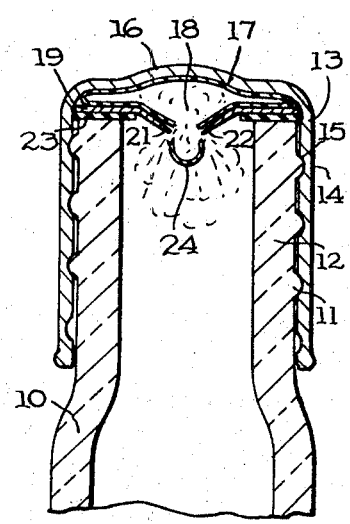
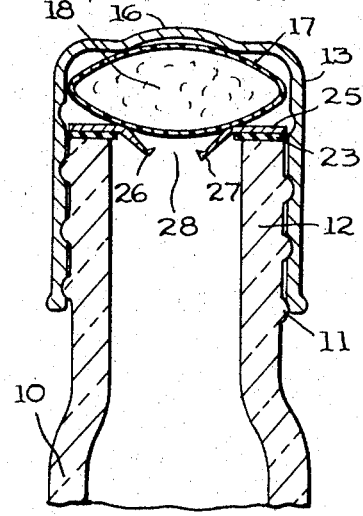
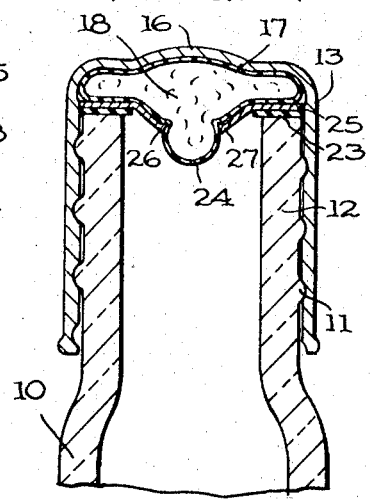
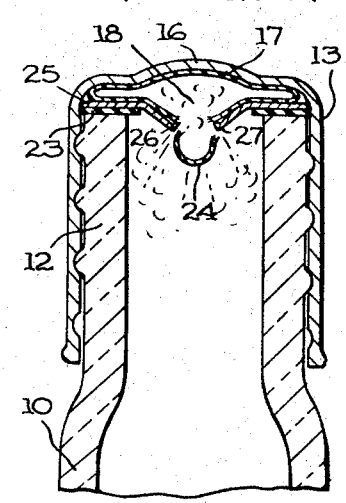
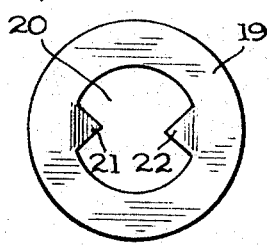
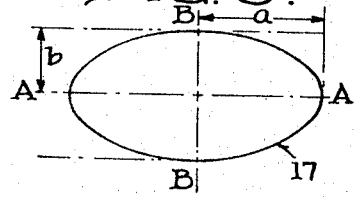
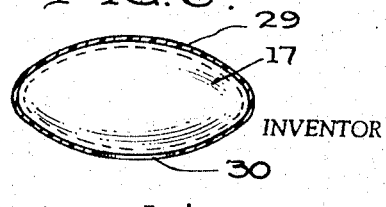
VOL.= $\frac{4}{3}\pi ab^2$
INVENTOR
ERNEST J. ANANDAM
BY
Cameron, Kerkam & Sutton
ATTORNEYS

United States Patent Office

3,451,894
Patented June 24, 1969

3,451,894
GAS CAP FOR CULTURE TUBES
Ernest J. Anandam, Knoxville, Tenn., assignor to The University of Tennessee Research Corporation, Knoxville, Tenn., a corporation of Tennessee
Filed Apr. 28, 1967, Ser. No. 634,770
Int. Cl. C12b 1/00, 1/20
U.S. Cl. 195—127                    7 Claims

ABSTRACT OF THE DISCLOSURE

A cap for culture tubes for tubercle bacilli and other capnophilic bacteria comprising a cylindrical screw cap within which is a rupturable capsule containing $CO_2$.

Background of the invention

This invention relates to an improved culture tube for the cultivation of tubercle bacilli and other capnophilic bacteria in which a rupturable capsule of $CO_2$ gas and a puncturing diaphragm and seal are proivded within the screw-threaded cap for the culture tube. When the cap is screwed down on the screw-threaded upper extremity of the culture tube the capsule will be ruptured and the $CO_2$ released into the culture tube for mixing with the air in the tube, to promote growth of the bacilli therein.

The amount of $CO_2$ present in the rupturable capsule in the cap should be sufficient to produce a concentration of from 2 to 5% $CO_2$ in the atmosphere in the tube, which is stimulatory and even essential for the growth of mycobacteria on the 7H10 agar medium.

It is well accepted that carbon dioxide influences the physiological process of bacteria in several ways. It is regarded as an essential constitutent of the environment for a variety of bacterial species. It has been reported that incubating bacteria under increased $CO_2$ tension (1 to 5%) abolishes the requirement of biotin for certain strains of Mycobacterium tuberculosis which require biotin.

Various methods have been used in the past to maintain an atmosphere of increased $CO_2$ in culture vessels. The most popular method of incubating the cultures with loose lids in $CO_2$ incubators had the disadvantage that the culture medium dried up due to the prolonged incubation necessary for the growth of mycobacteria. To overcome this problem, the cultures were placed in $CO_2$ permeable plastic bags, not permeable to water vapor, then incubated in $CO_2$ incubators. Many laboratories producing cultures for mycobacteria lacked the expensive $CO_2$ incubators, therefore a simpler method was devised using 7 x 14″ Mylar bags, which are impermeable to $CO_2$, to hold the cultures, along with a growing culture of *Mycobacterium phlei*, a saprophytic mycobacteria, on a separate Petri dish and sealing the bag. The growing *M. phlei* culture was found to produce an adequate amount of $CO_2$ to produce increased $CO_2$ tension inside the bag, in the course of time.

This method is presently becoming popular in many laboratories, especially since Kubica and associates' development of an improved method of sputum digestion with normal acetyl L-cysteine for the isolation of tubercle bacilli from clinical specimens.

While this method is an excellent one to eliminate the problems mentioned above, it involves the additional work of maintaining the culture of *M. phlei* and streaking the right amount of inoculum on a limited quantity of agar medium. Further, it requires more than eight days to attain the minimum required concentration of $CO_2$ and there is also the posisbility of depletion of oxygen content when incubation is prolonged while *M. phlei* is still growing.

The present invention was therefore developed to eliminate the many problems enumerated above and to obtain better results with much less expensive equipment.

A prior patent of interest is Mackin, Patent No. 3,248,- 302, which discloses the insertion within a Petri dish of a capsule containing a reducing agent or agents, or other chemicals for producing the desired atmospheric conditions within the sealed dish. The capsule is so positioned at one of the corners of the dish that when the lid is applied to the dish and forced downwardly, the capsule is ruptured, releasing its contents to the sealed interior of the dish to produce the required atmospheric conditions.

Other patents of interest in the field are numbers 2,285,- 651; 3,013,950; 3,055,808; 3,064,853 and 3,246,959, which relate to culture development, but do not disclose the inventive concept of the present invention.

Summary of the invention

The invention comprises, in brief, an improved culture tube, in the screw-threaded cap of which is placed a rupturable film capsule containing $CO_2$ gas, under which are provided an open, perforating washer and a sealing washer, whereby when the cap is screwed down upon the screw-threaded neck of the culture tube the capsule protrudes downwardly through the washer orifices into the neck of the tube and is then ruptured, releasing its $CO_2$ into the atmosphere in the tube to promote growth of the culture therein.

It is therefore an object of this invention to provide an improved cap and capsule structure for a culture tube which is inexpensive and highly efficient and which eliminates the necessity for ancillary, expensive laboratory equipment.

It is a further object of this invention to produce a culture tube which is more efficient and in which the culture grows more readily than in conventional tubes.

It is another object of this invention to provide improved means for computing the amount of $CO_2$ to be contained in the capsule for a given culture tube.

Other and further objects of this invention will become apparent as this specification proceeds.

Brief description of the drawings

FIG. 1 is a partial vertical, cross-sectional view of one embodiment of an improved cap and capsule structure for a culture tube, showing the open, neck end of the tube and the capsule in position within the screw-threaded cap of the tube over the metal washer and the rubber washer, prior to screwing down the cap on the neck of the tube to rupture the capsule and release its contents into the tube;

FIG. 2 is a partial, vertical, cross-sectional view of the embodiment shown in FIG. 1 with the cap screwed down partially on the neck of the tube, compressing the capsule and forcing the capsule protrusion through the washer orifice between the points, prior to its rupture;

FIG. 3 is a similar view with the cap fully screwed down on the tube, showing the capsule protrusion ruptured by the washer points and the $CO_2$ released into the tube;

FIG. 4 is a top plane view of the metal washer of FIG. 1 showing the center orifice and the rupturing points disposed on opposite sides thereof;

FIG. 5 is a schematic vertical sectional view of the capsule, showing its axes and the formula for computing its volume;

FIG. 6 is a vertical sectional view of a modified form of capsule, in which most of the capsule surface is of heavy, or coated polyethylene, save for a small circular area, disposed at its lower center section, which is of thin polyethylene;

FIG. 7 is a partial vertical, cross-sectional view of an alternative embodiment of the invention, showing the capsule in position within the tube cap, prior to screwing the cap tightly on the tube;

FIG. 8 is a vertical cross-sectional view of the embodiment shown in FIG. 7 with the cap partially screwed downward on the tube, and the capsule protrusion forced through the disc orifice between the prongs thereof, prior to the rupturing of the capsule; and FIG. 9 is a view showing the embodiment of the cap structure of FIG. 7 fully screwed down on the culture tube, with the capsule protrusion ruptured by the disc prongs and the $CO_2$ released into the tube.

Description of the preferred embodiments

Referring to FIG. 1, the culture tube 10 is partially shown, provided with screw threads 11 about its reduced neck 12, which is open at its upper extremity. Culture tube 10 is preferably formed of glass and is cylindrical in shape with a closed lower extremity. Cylindrical screw cap 13 is shown formed of Bakelite or analogous material and provided with depending neck 14 which is internaly screw threaded at 15 to mate with the screw threads 11 of culture tube neck 12.

At its upper surface cap 13 is provided with an upwardly enlarged, circular central section 16 for a purpose hereinafter to be more fully discussed.

Closely fitted within the upper portion of cap 13 and conforming to the curvature of its upper section 16 is a capsule 17 of prolate spheroid shape, preferably formed of a polyester film such as polyethylene terephthalate, which is collapsible and is also impermeable to $CO_2$. The capsule 17 is provided with a desired quantity of sterile $CO_2$ 18 in slightly compressed state and, as shown, is substantially elliptical in vertical cross section and of a length on its major axis, to fit closely within cap 13, its rounded upper surface conforming to the rounded top surface of cap 13.

Provided under capsule 17 in cap 13 and closely fitting therewithin under capsule 17 is a metal disc or washer 19, which is of light gauge and is provided with a central circular orifice 20, laterally of which are provided downwardly inclined, opposed, sharpened points 21 and 22, which are designed to puncture the protrusion 24 of the lower surface of capsule 17 at opposed points when cap 13 is screwed down fully on neck 12 of tube 10. Disc 19 is preferably of a slightly smaller outer diameter than the inner diameter of cap 13, to fit readily therein.

A rubber washer 23, of an outer diameter substantially equal to the inner diameter of cap 13 is fitted within cap 13 under metal washer 19 therein and is closely fitted thereunder. Washer 23 is provided to seal the entire upper section of the cap 13 against egress of $CO_2$ therefrom, when cap 13 is screwed downwardly on neck 12 of tube 10. As shown, points 21 and 22 are preferably bent downwardly at an angle of about 40° whereby their flattened upper surfaces lie against the lower lateral surfaces of protrusion 24 of capsule 17 prior to the complete tightening down of cap 13, as shown in FIG. 2, thereby preventing premature rupturing of capsule 17.

As aforesaid, in this embodiment, the prolate spheroid capsule 17 is first closely fitted within the upper portion of cap 13 and metal disc 19 and rubber washer 23 are then placed within cap 13, under capsule 17, maintaining capsule 17 in proper alignment within cap 13, with its upper surface bearing closely against the inner wall of the upper curved surface 16 of cap 13 and its longitudinal extremities bearing against the opposite inner walls of the cap. It will thus be seen that with the capsule, disc and rubber washer thus installed within cap 13, when cap 13 is screwed downwardly over threads 11 of neck 12 of the culture tube increasing pressure will be produced against capsule 17 as it is compressed between the top of cap 13, disc 19, washer 23 and the neck of the tube. As the capsule is compressed, the increased pressure of the $CO_2$ therein forces protrusion 24 at the bottom center of the capsule to bulge through orifice 20 in the center of washer 19 and forces protrusion 24 downwardly between points 21 and 22 of washer 19 into the center of the neck 12 of the tube 10, as shown in FIG. 2. When the cap 13 is fully screwed down on neck 12, as shown in FIG. 3, points 21 and 22 penetrate the sides of protrusion 24, rupturing the capsule and releasing its pressurized $CO_2$ content into the tube 10 to produce the required atmosphere therein. With cap 13 fully screwed down on neck 12 capsule 17 will be in substantially flattened condition, as shown in FIG. 3, with all $CO_2$ gas therein forced under pressure into the tube. The upper portion of the cap and the space between the cap and neck will be completely sealed by the combination of rubber washer 23, disc 19 and the collapsed capsule.

A modified embodiment of the invention is shown in FIGS. 7, 8 and 9, which sequentially show the position of cap 13 and capsule 17 from start to finish of the screwing down of cap 13 on culture tube 10. In this embodiment capsule 17 is identical to the capsule shown in FIGS. 1, 2 and 3 and is composed of a polyester film impermeable to $CO_2$ and containing the desired quantity of sterile $CO_2$ in slightly compressed state. As shown, capsule 17 is in the shape of a prolate spheroid of a length to fit closely within the diameter of cap 13.

The metal disc structure in this second embodiment of the invention differs slightly from that in the first embodiment in that metal disc 25 is provided with paired, downwardly inclined and then upwardly returned penetrating points 26 and 27, the distance between points 26 and 27 in the center orifice 28 of disc 25 being slightly smaller than that between points 21 and 22 in the embodiment shown in FIGS. 1, 2 and 3. Here again, rubber washer 23 is provided under metal disc 25 to seal the neck of the tube under cap 13 when the cap is fully screwed down on the tube.

In view shown in FIG. 7 the cap 13 is in its upper position on tube 10 with the screw threads mated between the cap and the neck of the tube but with only slight pressure exerted on capsule 17. In the view shown in FIG. 8, the cap 13 is screwed partially down, the capsule 17 is compressed and the lower central, protrusion 24 thereof extends downwardly through disc orifice 28 between the points 26 and 27. In this view, points 26 and 27 have not yet perforated the central protrusion 24 of the capsule, but are about to do so. It will also be noted that rubber washer 23 has been compressed outwardly from the edges of the neck of the tube to seal the tube about its periphery under cap 13.

In the view shown in FIG. 9, the cap 13 is screwed completely down to its lowest limit, points 26 and 27 of disc 25 have penetrated capsule 17 at opposite sides of protrusion 24 and the $CO_2$ content of capsule 17 has been forced downwardly into tube 10.

It will be seen that with the cap fully screwed down on the neck of the culture tube it is fully sealed by the walls of the capsule itself and by rubber washer 23 to prevent escape of gas outwardly therefrom.

Referring to the schematic showing in FIG. 5, the capsule 17 is shown as a prolate spheroid, formed by the rotation of an elipse about its major axis A, the volume of which is $\frac{4}{3}\pi ab^2$. As the wall thickness of the capsule is negligible, the external measurements of the capsule may be employed for the purpose of calibrating the volume of $CO_2$ contained in the capsule. Obviously, the dimensions of the capsule will vary, depending on the inside diameter of the cap and the volume of the tube. The capsule should be of a length on its major axis to fit closely within the cap.

The carbon dioxide content of the capsule will, of course, vary directly with the atmospheric volume inside the culture tube. The culture tube which is normally used for the culture of tubercle bacilii is similar to the Lowenstein Jensen medium tube, No. 03–273TS, of Baltimore Biological Laboratories. The amount of culture medium contained therein is uniform. The atmospheric content of this culture tube is 25 cc. Thus, to increase the $CO_2$ content of the tube by 3% the capsule should contain about 0.75 cc. of $CO_2$. The inner diameter of the cap for this tube is 1.5 cm. which will thus be the dimension of the major axis (A) of the capsule. If the minor axis of the capsule is 1 cm. the volume of the capsule will be 0.78 cc., applying the formula: volume=$\frac{4}{3}\pi ab^2$, $a$ and $b$ being the semi axes of A and B, as shown in FIG. 5. Thus, as the atmospheric content of varying sizes of media tubes is known, the volume of $CO_2$ required in the capsule may be computed. As the major axis of the capsule is of a length to fit the inner diameter of the cap, the minor axis may be computed for the required volume of $CO_2$.

In an alternative embodiment of the capsule structure shown in FIG. 6, the capsule 29 may be formed of comparatively heavy or coated polyester film over most of its upper and lower surfaces, except for a small circular area 30 of light polyester film disposed centrally of its bottom surface, which is of the size of the central orifice of the metal disc, and positioned thereover and will protrude therethrough and then rupture when full pressure is exerted on the capsule by screwing the cap fully down, thus forcing the gas into the tube.

In utilizing the cap and capsule structure the tube is fully sealed at all times, which prevents the drying up of the culture medium and acts to maintain the required $CO_2$/air ratio in the tube.

The gas cap eliminates the need for large and expensive $CO_2$ incubators or complicated gas chambers for the culture of bacteria.

The invention further eliminates the necessity for the use of bacterial cultures as the source of $CO_2$ and also eliminates the possibility of oxygen depletion. Using the cap and capsule structure of this invention, an environment with the desired concentration of $CO_2$, i.e., from 1–5%, is created simply and is maintained from the time the tube is sealed.

Obviously, the cap and capsule can be made in any dimensions and capacity required, depending upon the size of the culture tube involved and the percentage of $CO_2$ required therein. Normally, the capsule will contain less than 2 mls. of $CO_2$ gas, but this amount can be increased depending upon the atmospheric volume in the culture tube. The individual caps should be sterile and hermetically sealed, prior to use, to insure aseptic conditions. If it is necessary to open the culture tube, replacement of the cap will reconstitute the proper percentage $CO_2$ atmosphere in the tube.

The subject gas cap is primarily designed to eliminate many of the problems normally encountered in the cultivation of mycobacteria, but it can also be used successfully in the cultivation of certain pathogenic bacteria from clinical specimens which will not grow in the absence of increased $CO_2$ tension.

Numerous modifications of the gas cap structure may be made without departing from the spirit of this invention and, as aforesaid, the capsule itself may be formed of comparatively heavy polyester film with a weakened lower portion of thin film at its bottom center, aligned over the metal disc orifice, which will rupture when pressure is applied over the surface of the capsule by the screwing down of the cap thereover.

Culture tubes as disclosed herein are particularly well adapted for use in the field and where $CO_2$ incubators or gas chambers are not available. They have the added advantage that the bacteria are cultured with high efficiency and under uniform conditions.

The invention is susceptible of numerous modifications without departing from the spirit thereof.

Attention is directed to the appended claims for a limitation of the scope of this invention.

I claim:

1. In a gas cap for culture tubes, a cylindrical, internally screw-threaded cap, a rupturable capsule of $CO_2$ disposed within the upper portion of said cap, a metal washer closely fitted within said cap under said capsule and provided with a central orifice, a rubber washer disposed under said metal washer within said cap, sharpened projections oppositely disposed on the inner periphery of the orifice of said metal washer whereby when said cap is screwed downwardly on said tube said capsule will be compressed between the neck of the tube and the top of said cap, will protrude downwardly through the orifice of said metal washer and will be punctured by said sharpened projections when said cap is screwed down fully, releasing its $CO_2$ content into said tube.

2. A gas cap in accordance with claim 1, in which the $CO_2$ capsule is formed of a polyester film.

3. A gas cap in accordance with claim 1, in which the capsule is in the form of a prolate spheroid.

4. A gas cap in accordance with claim 1 in which the capsule contains $CO_2$ under pressure in an amount equal to from 1–5% of the atmospheric volume of the tube.

5. A gas cap in accordance with claim 1 in which the metal washer is provided with upwardly returned points on the extremities of the projections.

6. A gas cap in accordance with claim 1 in which the lower, central portion of the capsule is weakened over a circular area equal in size to the size of the disc orifice.

7. A gas cap in accordance with claim 1 in which the major axis of the capsule is equal to the diameter of the cap.

References Cited

UNITED STATES PATENTS 3,248,302   4/1966   Mackin.
3,326,401   6/1967   De Long.

ALVIN E. TANENHOLTZ, *Primary Examiner.*

U.S. Cl. X.R.

195—139, 142; 215—38; 220—39